Patented Dec. 20, 1949

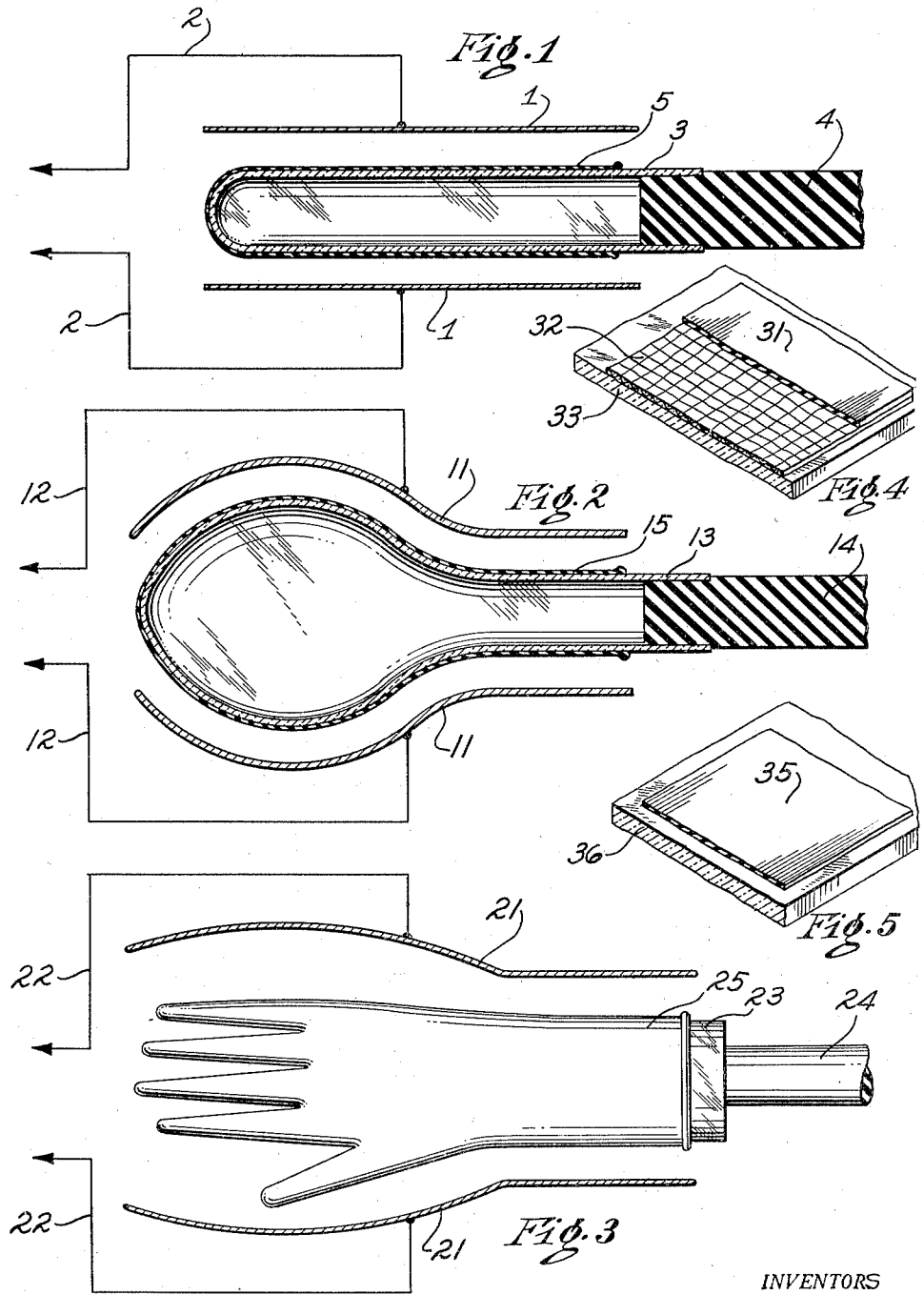

2,492,000

UNITED STATES PATENT OFFICE 2,492,000

METHOD OF MAKING THIN RUBBERLIKE FILMS

Harold B. Morris and Robert O. Morris, Akron, Ohio, assignors to F. B. Killian & Company, Akron, Ohio, a partnership Application June 15, 1946, Serial No. 677,061

6 Claims. (Cl. 18—53)

This invention relates generally to the art of making thin films from aqueous dispersions and is particularly concerned with a new method of and new means for making thin walled rubber articles such as balloons, prophylactics, gloves and the like from latex.

Films in the form of thin walled rubber articles have been made heretofore by processes which comprise the steps of dipping a form of the desired size and shape into a film forming dispersion of rubber or the like, manipulating the form to distribute the liquid material more or less uniformly over the surfaces thereof and subjecting the film to external heat for setting, drying and vulcanizing the dry film. There is a fairly well defined limit to the rate at which articles can be produced by these methods, that limit being determined by the rapidity with which the film can be dried and caused to set or solidify on the form to such an extent that it will not flow and thicken the walls in some places and thin them in other places. Usually gelling agents, such as sodium silicofluoride, ammonium sulfate and others well known in the art have been added to the solution or dispersion to expedite the setting of the rubber on the form. In other instances fabrics have been coated with an aqueous film and the moisture removed by the application of heat. This procedure has many advantages.

The present invention contemplates the manufacture of thin films and articles including such films, particularly thin wall rubber articles, in a better and faster manner and is predicated on the discovery that radio frequency current removes almost instantly the liquid from a thin film of a dispersion in water or water-like or polar liquid of a film-forming rubber or rubberlike material and that the use of the common coagulating, gelling or setting agents is not necessary. Thus the rate of production may be greatly increased and the quality of the product is greatly improved by the more positive and more rapid removal of the moisture by high frequency current application.

In the drawings accompanying and forming a part of this specification,

Figure 1 is a schematic view, partly in section, showing one form of apparatus for carrying out the present invention in the production of prophylactics;

Figures 2 and 3 are views similar to Fig. 1 but showing apparatus for carrying out the present invention in making balloons and gloves; and, Figures 4 and 5 are perspective views of other applications of this invention.

In Figure 1, two parallel electrodes 1 are connected thru leads 2 to the output of a suitable radio frequency generator (not shown). A form 3 composed of glass or other material which is a poor electrical conductor is mounted on a plug 4 for rotational movement while between electrodes 1. Form 3 has a surface film 5 of aqueous rubber dispersion thereon, such as latex. It will be understood that the electrodes 1 may be disc shaped but are, preferably, elongated rectangles. When the electrodes 1 are disc shaped the form 3 is rotated about a more or less fixed axis between the electrodes, but when the electrodes are elongated rectangles the form 3 may not only be rotated but may also be moved sidewise or translated between the electrodes for their full length. It will be understood that with elongated electrodes a given form may move more rapidly from one end of the electrodes to the other end with the same drying results than would be the case with shorter electrodes or even disc electrodes. In other words, the drying of the form is a function of the duration of electrical current applied to it and the forms may move at speeds which increase as the lengths of the electrodes increase.

One set of conditions under which apparatus illustrated by Fig. 1 has been operated satisfactorily is as follows: The rectangular electrodes 1 were about 30 inches long, about 7 inches wide, and approximately 3 inches apart. The form 3 was about $1\frac{7}{16}$ inches in diameter and was maintained midway between electrodes 1 with about $\frac{3}{4}$ inch space between it and each electrode 1 and carried a film of aqueous rubber solution or dispersion about .0025 inch thick. The current applied to conductors 2 was about 5000 volts at about 10 megacycles. The form 3 was rotated at about 55 R. P. M. Under these conditions substantially all the moisture was evaporated from the film 5 in about five seconds and the dried film was practically uniform in wall thickness, and was free from porosity, pin holes and the like.

It will be understood that the illustrative conditions mentioned above may be varied considerably within the scope of the present invention. The voltage may range from about 1000 volts to a voltage where corona effects are objectionable (approximately 15,000 volts) and the frequency of the current may range from about 6 megacycles to about 200 megacycles, altho frequencies in the general neighborhood of 6–30 megacycles have been found to be quite satisfactory. The spacing between the electrodes should be such as to prevent or minimize objectionable corona effects. In certain instances voltages of 3000 volts per inch of space between electrodes has not given objectionable corona effects. However, at voltages above about 2000 volts per inch there is always a possibility of "flashing over" and for that reason we prefer not to exceed about 2000 volts per inch of electrode spacing. The space between each electrode and the film to be treated may vary from about $\frac{1}{16}$ inch to as much as about $2\frac{1}{2}$ inches, depending on the voltages employed, the smaller spaces being used with the lower voltages. The thickness of the film may range between about .001 inch and about .020 inch.

In Fig. 2, electrodes 11 are shaped to correspond with the balloon form 13 which is mounted on plug 14 and carries a rubber film 15 on part of its surface. Radio frequency current is supplied from a generator (not shown) thru leads 12 to electrodes 11. The apparatus of Fig. 2 may be operated substantially as has been described in connection with Fig. 1.

In Fig. 3 electrodes 31 are shaped to resemble in certain respects the glove form 23 which has a film of rubber 25 thereon. Radio frequency current is supplied from a generator (not shown) thru leads 22 to electrodes 21. This apparatus may be operated as has been described above in conjunction with Figs. 1 and 2.

In applying the present invention to the manufacture of thin dipped rubber articles a form is dipped in an aqueous dispersion of rubber, for example, latex preferably containing vulcanizing ingredients. The form is then rotated between a pair of electrodes while the film is subjected to electrical impulses of the magnitude, all as above stated. The impulses or currents which travel from one electrode to the other cause extremely rapid removal of moisture in the film along lines substantially parallel to the electrodes. In other words, drying apparently takes place in a plane perpendicular to the electrodes, but since the form is rotating the drying takes place in the film progressively around the form.

Care should be taken to keep the temperature of the film below about the boiling temperature. It is the primary purpose of the present invention to remove the moisture from the film at relatively low temperatures because heating it to higher temperature might be detrimental to the quality of the products. Since most of the heat developed is employed to drive off the moisture and since heating occurs simultaneously thruout the entire thickness of the film, it will be understood that the moisture is very rapidly eliminated. As the moisture content progressively decreases the heating effect also decreases. By the selection and maintenance of proper spacing between the electrodes and films being dried, and by proper control of the power input, it is possible to obtain substantially non-porous drying of the film, that is, the drying takes place without causing porosity in the article.

It has been found that this rapid drying of the film thruout its thickness makes it unnecessary to add the chemical gelling agents and prevents further flow of the aqueous film on the form. While it is preferable to complete the drying of a film between the high frequency electrodes, it is not necessary that all the drying be done between the electrodes for the drying may be initiated by the electrodes and then completed by other suitable drying means, such as hot air and the like.

Conventional machines for making thin dipped rubber articles may be equipped with means for drying such articles by the present invention. For example, suitable electrodes such as those herein illustrated may be positioned beyond the dipping station or stations of such a machine in place of, or in conjunction with, the ordinary hot air drying apparatus. In this manner the conventional machines may be made to occupy much less space, or to operate at a much greater productive speed, and to produce substantially non-porous articles.

Figure 4 shows another application of the present invention. An aqueous film 31 is on one surface of a fabric article 32 which is supported on a dielectric or electrically poor conductive plate 33. The composition article is to be moved between a pair of electrodes and subjected to radio frequency current under substantially the conditions set out hereinabove. The moisture in the film is driven off in a very few seconds of flow of such current and the article comprising the fibrous portion and the dried film is then ready for further processing or use.

Figure 5 shows another application of the present invention. In this figure the aqueous film 35 on glass plate 36 is to be moved between electrodes of a radio frequency circuit under the conditions specified hereinabove, with resultant very rapid evaporation of the water in the film. The film of this figure may consist of any of the film forming materials above mentioned.

In treating articles such as those shown in Figs. 4 and 5, the electrodes should be disposed at opposite edges of the film and at right angles to the plane of the film. We have found that when the electrodes are parallel to and spaced apart from the plane of a film and the film is thin, for example less than about ⅛" thick, very little heating will take place when high frequency current is applied to the electrodes. Since considerable heating is required to remove moisture from the film, it may be removed from these thin films by placing the electrodes at the edges of the plane of the film so that the current will flow in the plane of the film from edge to edge of the film. A maximum width between such edge type electrodes will obviously exist and will depend on such factors as power input, thickness of film and the like. A spacing of about 15" between edge type electrodes is readily attainable within the limits of the variable factors above mentioned. If a film of a width greater than 15" is to be treated by this method, the electrodes at the edges of the wider film may be supplemented by parallel electrodes disposed adjacent to the plane of the film and parallel to the edge electrodes.

In certain instances the non-conducting supports of Figs. 4 and 5 may be omitted. Where, for example, the fabric of Fig. 4 is self-supporting, the glass plate 33 may be omitted.

Many different film forming materials may be converted into films by means of the present process. While rubber latex has been referred to in a detailed description hereinabove, it is not to be understood that the present invention is limited to such latex. On the contrary, it has wide application to natural rubber and synthetic rubber, resins and rubber-like materials. The process has been used satisfactorily on perbunan, Buna-S, neoprene, polyvinyl alcohol, polyvinyl acetate and polyvinyl butyral. In general, it may be said that films may be formed by this process from any material which can be dispersed in water or in watery, water-like, or polar liquids and which will form a film when such a liquid has been removed. In the appended claims the term "film forming" is used to include all such film forming dispersible materials.

While water has been mentioned as the dispersion medium in the foregoing specific description, it is not to be understood that this process is limited to the use of only water. On the contrary, water-like liquids and, in general, polar liquids may be used. The terms "watery" or "polar" as used in the appended claims include the stronger polar liquids such as organic liquids containing one or more hydroxyl groups. Those expressions exclude liquids which might be hazardous from fire or explosion standpoints.

We have found that the frequency and voltage of the current should be correlated for best results and greatest efficiency. Frequencies of about 6.7 megacycles can be advantageously used with a voltage of about 4000 volts and without encountering any substantial corona effects. Under those conditions the efficiency of the generator is high. The time required for heating with that current is longer than when the frequency is higher. When the frequency is high, for instance, about 10 megacycles, the voltage need not exceed about 3000 volts. The heating effect is faster and the efficiency is less with this current than with the above described current of 6.7 megacycles. In general, it may be said that as the frequency increases the voltage should decrease, the efficiency decreases and the heating time shortens. While it is possible to practice this invention with currents of frequencies from about 6 megacycles to about 200 megacycles the presently preferred range is from about 6.7 to about 30 and from about 6.7 to about 10 megacycles are especially suited to use with the illustrated types of articles.

Having thus described our invention so that others skilled in the art may be able to understand and practice the same, we state that what we desire to secure by Letters Patent is defined in what is claimed.

What is claimed is:

1. The method of making a thin dipped hollow cylindrical rubber article having an open end and a closed end portion which comprises the steps of rotating an electrically poor conductive form of the desired size and shape and having thereon an aqueous dispersion of rubber distributed in a layer of the desired thickness in its various parts between a pair of electrodes while subjecting the layer to electrical current of a frequency between about 6 megacycles and about 200 megacycles and a voltage between about 1000 volts and voltages where corona effects are objectionable until the moisture in said layer has been substantially removed, and then vulcanizing the thus dried article.

2. The method of making a thin dipped hollow cylindrical rubber article having an open end and a closed end portion which comprises the steps of rotating an electrically poor conductive form of the desired size and shape and having thereon an aqueous dispersion of rubber distributed in a layer of the desired thickness in its various parts between a pair of electrodes while subjecting the layer to electrical current of a frequency of approximately 6 megacycles and a voltage between about 1000 volts and voltages where corona effects are objectionable until the moisture in said layer has been substantially removed, and then vulcanizing the thus dried film.

3. The method of making a thin dipped hollow cylindrical rubber article having an open end and a closed end portion which comprises the steps of rotating and moving an electrically poor conductive form of the desired size and shape and having thereon an aqueous dispersion of rubber distributed in a layer of the desired thickness in its various parts sidewise between a pair of electrodes while subjecting the layer to electrical current of a frequency between about 6 megacycles and about 200 megacycles and a voltage between about 1000 volts and voltages where corona effects are objectionable until the moisture in said layer has been substantially removed, and vulcanizing the thus dried article.

4. The method of making a thin dipped hollow cylindrical rubber article having an open end and a closed end portion which comprises the steps of rotating an electrically poor conductive form of the desired size and shape and having thereon an aqueous dispersion of rubber distributed in a layer of the desired thickness in its various parts between a pair of electrodes while maintaining a space of from about $\frac{1}{16}''$ to about $2\frac{1}{2}''$ between the form and each electrode, subjecting the layer to electrical current flowing between said electrodes and having a frequency of between about 6 megacycles and about 200 megacycles and a voltage between about 1000 volts and voltages where corona effects are objectionable until the moisture in said layer has been substantially removed, and vulcanizing the thus dried article.

5. The method of making a thin dipped hollow cylindrical rubber article having an open end and a closed end portion which comprises the steps of rotating an electrically poor conductive form of the desired size and shape and having thereon an aqueous dispersion of rubber distributed in a layer of the desired thickness in its various parts between a pair of electrodes while maintaining a space of from about $\frac{1}{16}''$ to about $2\frac{1}{2}''$ between the form and each electrode, and subjecting the layer to an electrical current flowing between said electrodes and having a frequency of about 6.7 megacycles and a voltage of about 4000 volts for a few seconds and until the moisture in the layer has been substantially removed.

6. The method of making a thin dipped hollow cylindrical rubber article having an open end and a closed end portion which comprises the steps of rotating and moving an electrically poor conductive form of the desired size and shape and having thereon an aqueous dispersion of rubber distributed in a layer of the desired thickness in its various parts sidewise between a pair of electrodes while subjecting the layer to electrical current having a frequency of about 6.7 megacycles and a voltage of about 4000 volts until the moisture in said layer has been substantially removed.

HAROLD B. MORRIS.
ROBERT O. MORRIS.

REFERENCES CITED

The following references are of record in the file of this patent:

UNITED STATES PATENTS

| Number | Name | Date |
|---|---|---|
| 2,112,418 | Hart, Jr., et al. | Mar. 29, 1938 |
| 2,128,827 | Killian | Aug. 30, 1938 |
| 2,263,681 | Hart, Jr. | Nov. 25, 1941 |
| 2,319,174 | Wilson | May 11, 1943 |
| 2,353,256 | Maywald, Jr. | July 11, 1944 |

FOREIGN PATENTS

| Number | Country | Date |
|---|---|---|
| 301,477 | Italy | Nov. 30, 1928 |
| 477,911 | Great Britain | Jan. 10, 1938 |

Certificate of Correction

Patent No. 2,492,000                                                         December 20, 1949

HAROLD B. MORRIS ET AL.

It is hereby certified that error appears in the printed specification of the above numbered patent requiring correction as follows:

Column 1, line 29, for the word "advantages" read *disadvantages*;

and that the said Letters Patent should be read with this correction therein that the same may conform to the record of the case in the Patent Office.

Signed and sealed this 18th day of April, A. D. 1950.

[SEAL]

THOMAS F. MURPHY,
*Assistant Commissioner of Patents.*